United States Patent
Watanabe et al.

(10) Patent No.: US 7,379,244 B2
(45) Date of Patent: May 27, 2008

(54) ANTI-REFLECTION FILM

(75) Inventors: Yasuhisa Watanabe, Saitama (JP); Yoshiyuki Shirai, Saitama (JP)

(73) Assignee: Tamron Co., Ltd., Saitama (JP)

(*) Notice: Subject to any disclaimer, the term of this patent is extended or adjusted under 35 U.S.C. 154(b) by 0 days.

(21) Appl. No.: 11/603,903

(22) Filed: Nov. 24, 2006

(65) Prior Publication Data

US 2007/0070506 A1   Mar. 29, 2007

Related U.S. Application Data

(63) Continuation of application No. PCT/JP2005/009425, filed on May 24, 2005.

(30) Foreign Application Priority Data

May 26, 2004 (JP) .............................. 2004-156365

(51) Int. Cl.
G02B 1/10 (2006.01)

(52) U.S. Cl. ..................... 359/586; 359/587

(58) Field of Classification Search ............... 359/359, 359/580, 584, 586, 588, 587
See application file for complete search history.

(56) References Cited

U.S. PATENT DOCUMENTS 4,726,654 A * 2/1988 Kimura et al. ............. 359/588
6,493,144 B2 * 12/2002 Tanaka et al. ............. 359/580

FOREIGN PATENT DOCUMENTS

| JP | 4-260001 A | 9/1992 |
| JP | 6-208003 A | 7/1994 |
| JP | 10-20102 A | 1/1998 |
| JP | 10-319209 A | 12/1998 |
| JP | 2000-347002 A | 12/2000 |
| JP | 2002-107506 * | 4/2002 |
| JP | 2003-202405 A | 7/2003 |
| JP | 2004-138662 A | 5/2004 |
| WO | WO 03/021305 A2 | 3/2003 |

* cited by examiner

Primary Examiner—Alessandro Amari
(74) Attorney, Agent, or Firm—Jacobson Holman PLLC

(57) ABSTRACT

The present invention is dedicated to a cost reduced anti-reflection film of a multi-lamination structure that is reduced in number of layers and increased in thickness of the same for the purpose of facilitating the total control of the film thickness and that can be manufactured in a simplified process so as to reduce the manufacturing cost. Three component layers are deposited one over another on a substrate ranging from $1.90 \leq n_s \leq 2.10$ in refractive index at an arbitrary design basis wavelength within a wavelength range in and near visible band, and these layers exhibit optical properties as in the following table:

|  | Refractive Index 'n' | Optical Film thickness 'nd' |
|---|---|---|
| 1st Layer | $1.54 \leq n_1 \leq 2.00$ | $0.465 \lambda \leq n_1 d_1 \leq 0.575 \lambda$ |
| 2nd Layer | $1.95 \leq n_2 \leq 2.63$ | $0.490 \lambda \leq n_2 d_2 \leq 0.508 \lambda$ |
| 3rd Layer | $1.35 \leq n_3 \leq 1.55$ | $0.245 \lambda \leq n_3 d_3 \leq 0.255 \lambda$ |

11 Claims, 4 Drawing Sheets

- 4: 3RD LAYER
- 3: 2ND LAYER
- 2: 1ST LAYER
- 1: SUBSTRATE

ANTI-REFLECTION FILM

This is a continuation of PCT/JP05/009425 filed May 24, 2005 and published in Japanese.

FIELD OF THE INVENTION

The present invention relates to an anti-reflection film that has a substrate ranging from 1.9 to 2.1 in refractive index and is applied to optical components.

Downsizing devices and apparatuses is an endless strong demand in the market, and therefore, downsizing optical components built in the devices and apparatuses is an important goal in optical engineering design. To fabricate compact optical components, it is required to employ optical materials of higher refractive index, and an additional requirement is a cost reduced anti-reflection film of improved anti-reflection performance for such optical materials of the enhanced refractive index.

BACKGROUND ART

An anti-reflection film proposed in the art is of a multi-lamination structure where seven component layers are deposited one over another on a substrate ranging from 1.4 to 1.9 in refractive index at an arbitrary design basis wavelength within a wavelength range near visible band (see Patent Document 1 listed below).

Such a film configuration, since it has no thin film, hardly causes optical unevenness and tolerance of manufactured film thickness, and resultantly brings about an enhanced anti-reflection effect throughout the visible light band.

Some of other anti-reflection films in the prior art have a multi-lamination structure where a substrate of high refractive index equal to or greater than 2.0 underlies six component layers deposited one over another, alternating the one of high refractive index and the other of low refractive index. The closest, and third and fifth closest component layers to the underlying substrate are of film of "high refractive index" although lower in refractive index than the underlying substrate, the second and fourth closest component layers to the underlying substrate are of film of "middle or low refractive index", and the sixth closest or uppermost component layer is of film of "low refractive index" (e.g., see Patent Document 2 listed below). The anti-reflection film can successfully reduce a reflectivity down to 0.5% or even lower at a wavelength ranging from 400 nm to 700 nm, namely, throughout the entire visible band.

Still another prior art anti-reflection film is of three-lamination dielectric film structure where first, second and third component films, which are queued down as denoted by ordinal numbers from a light entrance medium primarily of air toward the surface of an optical component body, have their respective refractive indices $n_1$, $n_2$ and $n_3$ correlated as can be expressed in the following formula:

$$n_1 < n_2 < n_3$$

and have their respective film thicknesses (spectrometric wavelengths) $n_1 d_1$, $n_2 d_2$ and $n_3 d_3$ correlated in terms of the design basis wavelength (e.g., see Patent Document 3 listed below). Simply with such a three-lamination thin film structure stacked over the optical component body, the anti-reflection film can reduce a surface reflectivity in a wide visible light band, and since its processing method is not complicated, the manufacturing cost can also be reduced.

Optical devices having any of the prior art anti-reflection films include the one disclosed as having an anti-reflection film that consists of an intermediate refractive index film layer, a high refractive index film layer overlying the intermediate refractive index film layer, and a low refractive index film layer further overlying the high refractive index film layer where the intermediate refractive index film layer is made of a mixture of substances of the high and low refractive index film layers (e.g., in Patent Document 4 listed below). This is conspicuous in that a reflectivity within the visible light band and a peak value of the reflectivity at the design center wavelength keep small independent of the refractive index of the substrate.

<Patent Document 1>
Claims and Detailed Descriptions in the Official Gazette of Japanese Preliminary Patent Publication No. H10-20102
<Patent Document 2>
Claims and Detailed Descriptions in the Official Gazette of Japanese Preliminary Patent Publication No. 2000-347002
<Patent Document 3>
Claims and Detailed Descriptions in the Official Gazette of Japanese Preliminary Patent Publication No. H4-260001
<Patent Document 4>
Claims and Detailed Descriptions in the Official Gazette of Japanese Preliminary Patent Publication No. 2003-202405

The anti-reflection film disclosed in Patent Document 1 is of a multi-lamination structure consisting of seven layers over a substrate ranging from 1.4 to 1.9 in refractive index at an arbitrary design basis wavelength within a wavelength range near visible band, and if the substrate is 2.0 or higher in refractive index, the reflectivity is prone to rise up to 15 to 20%.

The anti-reflection film disclosed in Patent Document 2 is deposited over a substrate of a high refractive index of 2.0 or even greater, and the film is of a multi-lamination structure consisting of layers as many as six in number, which results in an increased manufacturing cost.

The anti-reflection film of the three-lamination dielectric film disclosed in Patent Document 3 is, simply with three thin films deposited over the optical component body, capable of reducing a surface reflectivity within a wide band of visible light, and since its processing method is not complicated, the manufacturing cost can also be reduced. Under such requirements of the refractive index and the film thickness, however, the anti-reflection film cannot retain its reflectivity 1% or under within a visible band from 400 nm to 700 nm when deposited over the substrate of 1.90 or greater in refractive index, which attains an insufficient anti-reflection effect within the visible band.

The anti-reflection film for optical devices as disclosed in Patent Document 4 is of a three-lamination structure consisting of the intermediate refractive index layer, the high refractive index layer overlying the intermediate refractive index layer, and the low refractive index layer further overlying the high refractive index layer. Under the requirements of component film thickness (i.e., spectrometric wavelength) for the queued arrangement of the substrate—$0.25\lambda$ thin film—$0.5\lambda$ thin film—$0.25\lambda$ thin film—the air, however, the anti-reflection film applied over the substrate of 1.90 or greater in refractive index cannot retain the reflectivity 1% or below within the visible band from 400 nm to 700 nm, which attains an insufficient anti-reflection effect within the visible band.

The present invention is made in order to overcome the aforementioned disadvantages of the prior art anti-reflection films, and accordingly, it is an object of the present invention is to provide an anti-reflection film of the increased anti-reflection performance that can be applied to an optical material of high refractive index for the purpose of downsizing optical components.

It is another object of the present invention to provide a cost reduced anti-reflection film of a multi-lamination structure that is reduced in number of layers and increased in thickness of the same for the purpose of facilitating the total control of the film thickness and that can be manufactured in a simplified process so as to reduce the manufacturing cost.

SUMMARY OF THE INVENTION

The present invention provides an anti-reflection film that has three component layers overlying a substrate and deposited one over another in the order as given by ordinal numbers, 1st to 3rd, where, at an arbitrary design basis wavelength λ within a wavelength range in and near visible band, a refractive index 'n' and an optical film thickness (spectrometric wavelength) 'nd' are given as follows for each of the substrate and the component layers deposited on the same:

|  | Refractive Index 'n' | Optical Film thickness 'nd' |
|---|---|---|
| Substrate | $1.90 \leq n_s \leq 2.10$ |  |
| 1st Layer | $1.54 \leq n_1 \leq 2.00$ | $0.465 \lambda \leq n_1 d_1 \leq 0.575 \lambda$ |
| 2nd Layer | $1.95 \leq n_2 \leq 2.63$ | $0.490 \lambda \leq n_2 d_2 \leq 0.508 \lambda$ |
| 3rd Layer | $1.35 \leq n_3 \leq 1.55$ | $0.245 \lambda \leq n_3 d_3 \leq 0.255 \lambda$ |

A first aspect of the present invention is characterized in that $n_3 < n_1 < n_2$ or $n_1 < n_s < n_2$ is satisfied, the first layer is made of either $Y_2O_3$ or $Al_2O_3$, the second layer is made of any of mixtures of $ZrO_2$ and $TiO_2$, $TiO_2$, $Ta_2O_5$, $Nb_2O_5$, and the like, the third layer is made of either $SiO_2$ or $MgF_2$, and/or the first to third layers are produced by any means of sputtering, ion assisted deposition, and ion plating.

According to a second aspect of the present invention, an anti-reflection film is deposited on a substrate that is 1.90 or higher in refractive index and is made of optical material, and the anti-reflection film has first to third layers. The anti-reflection film is characterized in that the first layer is made of a material selected from $Y_2O_3$ (yttrium oxide) and $Al_2O_3$ (aluminum trioxide), overlying the substrate with an optical film thickness (spectrometric wavelength) greater than that of the third layer, the second layer is made of a material selected from $ZrO_2$ (zirconium dioxide), $TiO_2$ (titanium dioxide), mixtures of them, $Ta_2O_5$ (tantalum pentoxide), and $Nb_2O_5$ (columbium pentoxide), overlying the substrate with the optical film thickness greater than that of the third layer, and/or the third layer is made of a material selected from $SiO_2$ (silicon dioxide), $MgF_2$ (magnesium fluoride), and $CaF_2$ (calcium fluoride).

The second aspect of the present invention is further characterized in that the first to third layers are produced by any means of sputtering, ion assisted deposition, and ion plating.

According to a third aspect of the present invention, an anti-reflection film has a substrate of 2.10 or below in refractive index $n_s$, a first layer of a refractive index $n_1$ smaller than $n_s$, a second layer of a refractive index $n_2$ greater than $n_s$, and a third layer of a refractive index $n_3$ smaller than $n_s$, and the anti-reflection film is characterized in that the maximum value of a reflectivity in a visible band is 0.5% or below.

The anti-reflection film of the third aspect of the invention is characterized in that a reflectivity steeply falls or rises at both extreme zones of shorter- and longer-wavelength ranges throughout the visible light band, the first layer has an optical film thickness (spectrometric wavelength) $n_1 d_1$ twice as large as that of the third layer $n_3 d_3$ while the second layer has an optical film thickness $n_2 d_2$ twice as large as $n_3 d_3$, the third layer has its refractive index $n_3$ smaller than any of the refractive indices $n_s$, $n_1$ and $n_2$ of the substrate, the first layer, and the second layer, and/or the first layer has its refractive index $n_1$ smaller than any of the refractive indices $n_s$, $n_2$ and $n_3$ of the substrate, the second layer, and the third layer.

When the refractive index of the first layer exceeds the lower limit, the reflectivity disadvantageously rises in the entire visible band, and when it exceeds the upper limit, a width of a reflection zone within the visible band is narrowed. When the optical film thickness of the first layer exceeds the lower limit, the peak reflectivity disadvantageously reaches more than 0.5% in the visible band ranging from 520 to 650 nm, and when it exceeds the upper limit, the peak reflectivity reaches more than 0.5% in the visible band ranging from 450 to 500 nm.

When the refractive index of the second layer exceeds the lower limit, the peak reflectivity is prone to reach more than 0.5% in the visible bands ranging from 420 to 460 nm and from 570 to 650 nm, and when it exceeds the upper limit, the width of the reflection zone within the visible band is narrowed. When the optical film thickness of the second layer exceeds the lower limit, the peak reflectivity disadvantageously reaches more than 0.5% in the visible band ranging from 420 to 470 nm, and when it exceeds the upper limit, the peak reflectivity is prone to reach more than 0.5% in the range from 550 to 620 nm.

When the refractive index of the third layer of the invention exceeds the lower limit, the width of the reflection zone within the visible band is adversely narrowed, and when it exceeds the upper limit, the reflectivity rises in the entire visible band. When the optical film thickness of the third layer exceeds the lower limit, the peak reflectivity is prone to rise in the visible band ranging from 550 to 620 nm, and when it exceeds the upper limit, the peak reflectivity rises in the range from 420 to 470 nm.

The requirements of the invention, $n_3 < n_2 < n_1$, are those to attain an anti-reflection effect throughout the visible band with a smaller number of the component layers, and if the requirements are not met, the width of the reflection zone is narrowed while the reflectivity is only locally raised, which resultantly brings about a poor reflection property of chromatic imbalance.

The requirements of the invention, $n_1 < n_2 < n_3$, are those to determine the well-balanced width of the reflection zone with the reflectivity, and if the requirements are not met, an imbalance of low reflectivity/narrowed reflection band width or raised reflectivity/wide reflection band width is caused. Thus, in accordance with the present invention, optimizing the refractive index, the optical film thickness (spectrometric wavelength), and the material of each component layer in combination, the resultant anti-reflection film can widen the visible light band and reduce the reflectivity therein down to less than approximately 0.5% in peak value and to less than approximately 0.2% in average.

Thus, the present invention provides an anti-reflection film of enhanced anti-reflection performance that can be applied to optical components of high refractive index so as to downsize optical products.

Furthermore, the present invention provide a cost reduced anti-reflection film of a multi-lamination structure that is reduced in number of layers and increased in thickness of the same for the purpose of facilitating the total control of the film thickness and that can be manufactured in a simplified process so as to reduce the manufacturing cost.

DETAILED DESCRIPTIONS OF THE PREFERRED EMBODIMENTS

Figure 1:
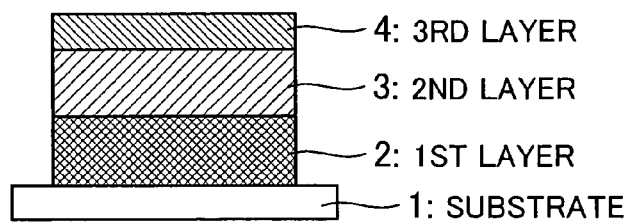
FIG. 1 illustrates a configuration of an anti-reflection film according to the present invention.

Best mode to implement the invention will now be described in conjunction with the accompanying drawings. On the assumption of an arbitrary design basis wavelength $\lambda$ within a wavelength range in and near visible band, as shown in FIG. 1, three layers are deposited on a substrate 1 one over another; specifically, a first layer 2 of an intermediate refractive index overlies the substrate 1, a second layer 3 of a high refractive index overlies the first layer 2, and a third layer 4 of a low refractive index overlies the second layer 3.

Embodiment 1

An exemplary anti-reflection film according to the present invention is 1.90 in substrate refractive index and 510 nm in spectrometric wavelength $\lambda$, as detailed in the table below:

TABLE 1

| Layer # | Refractive Index | Spectrometric wavelength | Materials |
| --- | --- | --- | --- |
| Substrate | 1.90 | | |
| 1st Layer | 1.76 | 0.50 $\lambda$ | Mixtures of $Y_2O_3$, $La_2O_3$, and $Al_2O_3$, or Mixtures of $ZrO_2$ and $SiO_2$ |
| 2nd Layer | 2.30 | 0.50 $\lambda$ | $Nb_2O_5$ or $TiO_2$ |
| 3rd Layer | 1.46 | 0.25 $\lambda$ | $SiO_2$ |
| Air | 1.00 | | |

Figure 2:
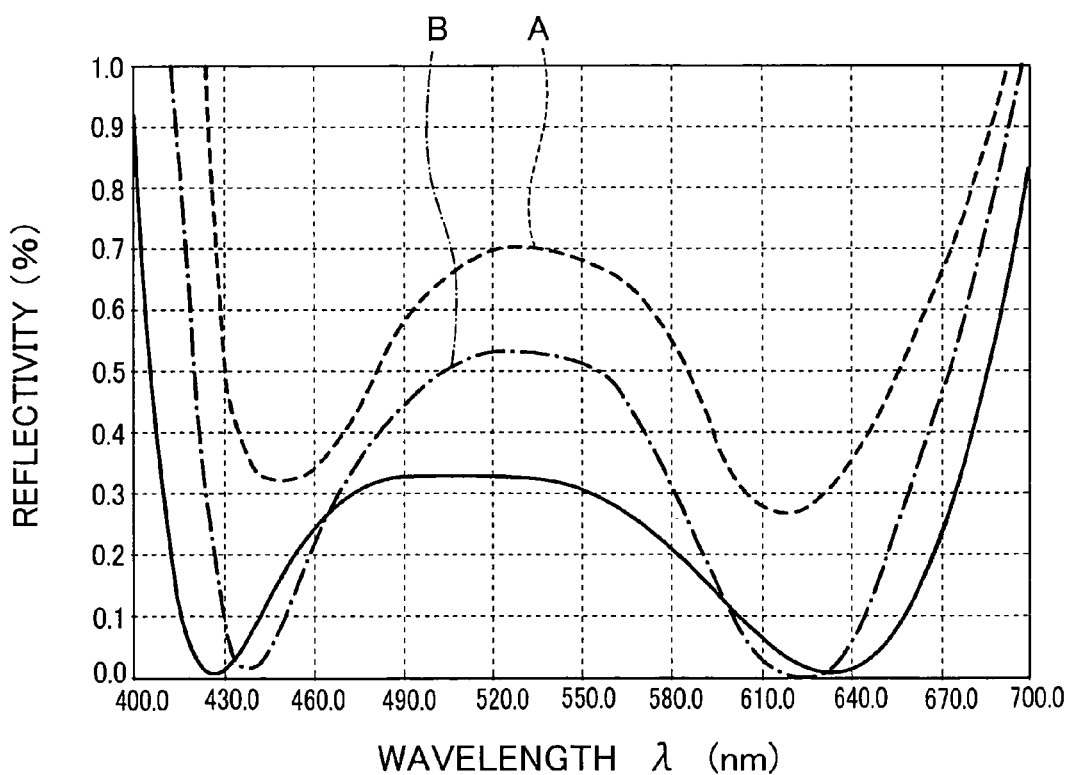
FIG. 2 is a graph showing a reflectivity for a first preferred embodiment of the anti-reflection film, and comparison examples 1 and 2 to the anti-reflection film.

FIG. 2 shows a reflectivity of the first embodiment of the anti-reflection film in the event of an incident angle of light beam ranging from 0 to 10 degrees. As will be recognized from solid characteristic curves of the reflectivity in FIG. 2, the anti-reflection film effectively reduces the reflectivity in both shorter- and longer-wavelength zones than a peak throughout a visible light band, and it makes an inclination of the characteristic curves drastically steeper at extreme zones of further shorter and longer wavelengths. In this way, the reflectivity can be retained down to approximately 0.5% or even below throughout the visible light band, and yet as low as approximately 0.2% in average.

<Comparison 1>

In FIG. 2, a graph A of broken line is given regarding the anti-reflection film where the second layer is 2.50 in refractive index with the remaining components similarly configured to those in the Embodiment 1. This comparison example 1 results in a visible light-transmitting band being narrowed to raise the peak reflectivity as high as 0.7%.

<Comparison 2>

In FIG. 2, a graph B of broken line is given for the anti-reflection film where the substrate is 1.80 in refractive index with the remaining components similarly configured to those in the Embodiment 1. This comparison example 2, compared with the comparison example 1, provides a slightly improved width of the visible light transmitting band but still results in the peak reflectivity over 0.5%.

From the comparison examples 1 and 2, it can be appreciated that the first embodiment of the anti-reflection film is advantageous in that it provides a wide visible light-transmitting band and gives a flattened characteristic curve without a peak of the reflectivity as well as the reflectivity lower than 0.5%.

Embodiment 2

Another or a second embodiment of the present invention is 2.00 in substrate refractive index and 510 nm in spectrometric wavelength $\lambda$, as detailed in the table below:

TABLE 2

| Layer # | Refractive Index | Spectrometric wavelength | Materials |
| --- | --- | --- | --- |
| Substrate | 2.00 | | S-LAH79 (Available from Ohara, Inc.) |
| 1st Layer | 1.76 | 0.50 $\lambda$ | Mixtures of $Y_2O_3$, $La_2O_3$, and $Al_2O_3$, or Mixtures of $ZrO_2$ and $SiO_2$ |
| 2nd Layer | 2.35 | 0.50 $\lambda$ | $Nb_2O_5$ or $TiO_2$ |
| 3rd Layer | 1.46 | 0.25 $\lambda$ | $SiO_2$ |
| Air | 1.00 | | |

Figure 3:
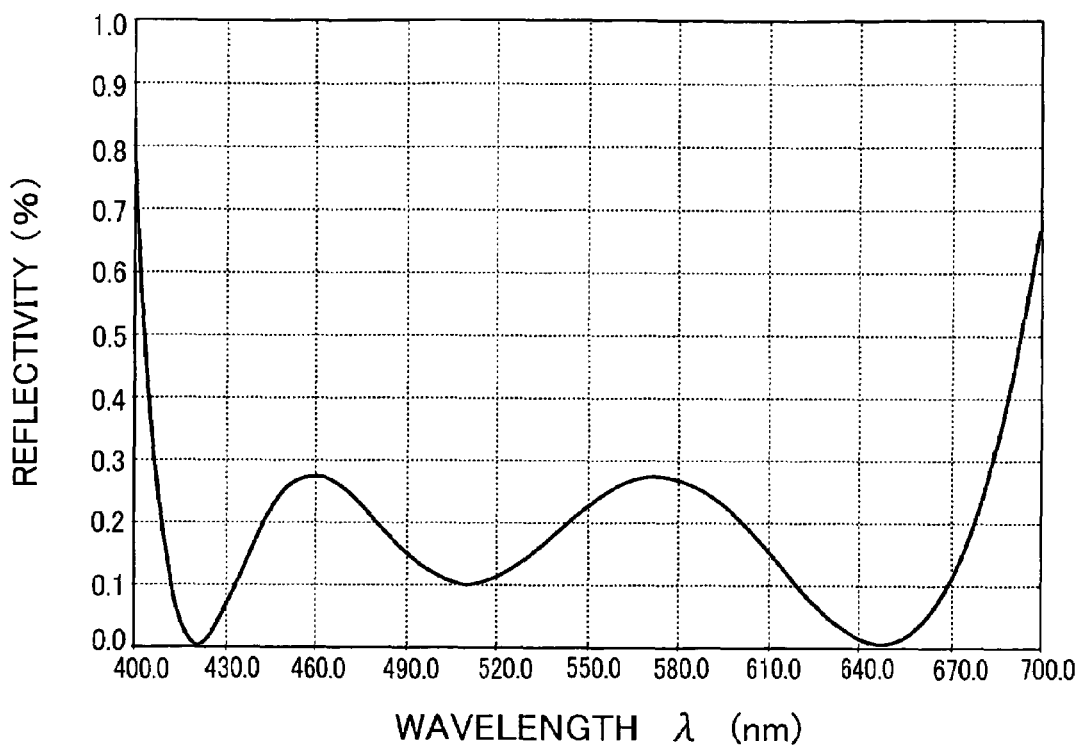
FIG. 3 is a graph showing a reflectivity for a second preferred embodiment of the anti-reflection film.

FIG. 3 shows a reflectivity of the second embodiment of the anti-reflection film in the event of the incident angle of light beam ranging from 0 to 10 degrees. This embodiment of the anti-reflection film has its substrate refractive index raised up to 2.00 and the second-layer refractive index up to 2.35, respectively. As can be seen from a solid characteristic curve of the reflectivity in FIG. 3, there are relatively moderately pointed two peaks throughout the entire width of the visible light transmitting band where a reflectivity level of both the peaks is 0.3% or even below. In addition, the anti-reflection film significantly reduces the reflectivity in three bottoms of valleys surrounding the peaks. Moreover, the anti-reflection film makes an inclination of the characteristic curve drastically steeper in both shorter- and longer-wavelength zones on opposite sides of the visible light band, and, this also results in an effective reduction of the reflectivity. In this case, the reflectivity can be retained as low as approximately 0.2% or even below. Especially, over the visible light band, the reflectivity at the peaks is still yet retained as low as approximately 0.3% or even below.

Embodiment 3

Another or a third embodiment of the anti-reflection film according to the present invention is 2.10 in substrate refractive index and 510 nm in spectrometric wavelength $\lambda$, as detailed in the table below:

TABLE 3

| Layer # | Refractive Index | Spectrometric wavelength | Materials |
|---|---|---|---|
| Substrate | 2.10 | | |
| 1st Layer | 1.76 | 0.50 $\lambda$ | Mixtures of $Y_2O_3$, $La_2O_3$, and $Al_2O_3$, or Mixtures of $ZrO_2$ and $SiO_2$ |
| 2nd Layer | 2.40 | 0.50 $\lambda$ | $TiO_2$ |
| 3rd Layer | 1.46 | 0.25 $\lambda$ | $SiO_2$ |
| Air | 1.00 | | |

Figure 4:
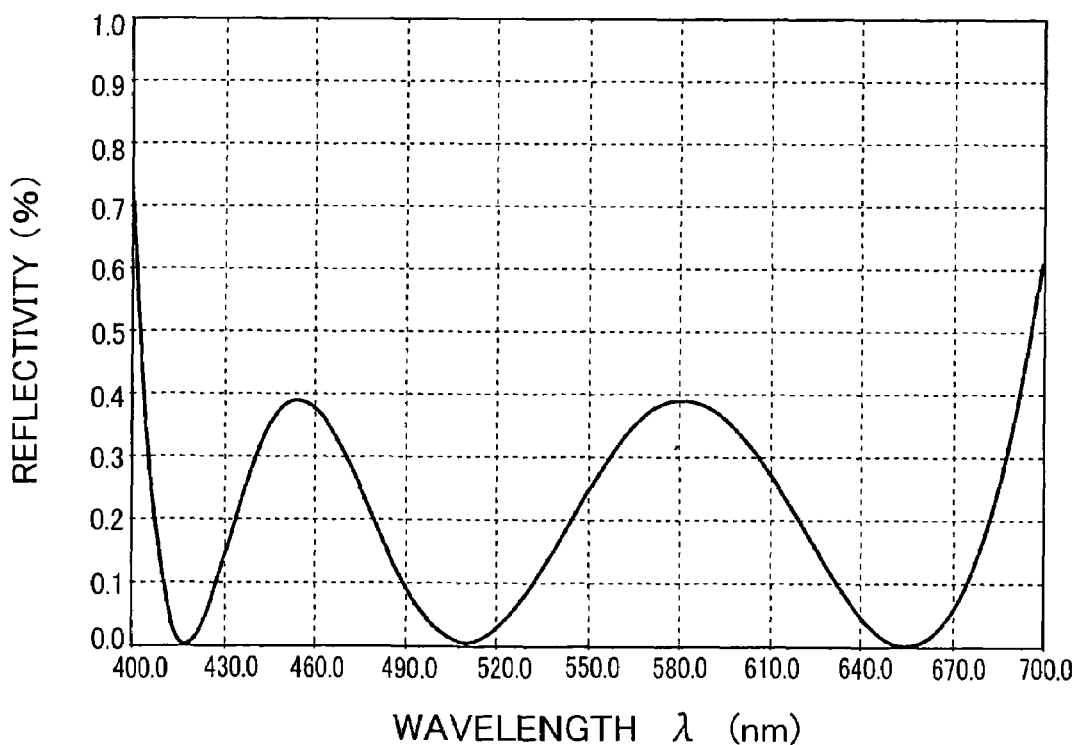
FIG. 4 is a graph showing a reflectivity for a third preferred embodiment of the anti-reflection film.

FIG. 4 shows a reflectivity of the third embodiment of the anti-reflection film in the event of the incident angle of light beam ranging from 0 to 10 degrees. This embodiment of the anti-reflection film is 2.10 in substrate refractive index and 2.40 in second-layer refractive index, and the material of the second layer is restricted to $TiO_2$. The third embodiment of the anti-reflection film exhibits, in comparison with the second embodiment, a property expressed by the very similar characteristic curve where there are two peaks throughout the visible light band; more specifically, the characteristic curve gives a strong contrast of ups and downs from the peaks to the bottoms of the valleys and vice versa, and the reduction of the reflectivity at the bottoms of the valleys is further conspicuous. The inclination of the characteristic curve on both the shorter- and longer-wavelength zones than the peaks is much steeper, and a further comprehensive review draws a conclusion that the reflectivity reaches as low as approximately 0.4% or below even at the peaks in the visible light band, and can be reduced down to approximately 0.2% in average.

Embodiment 4

Still another or a fourth embodiment of the anti-reflection film according to the present invention is 2.00 in substrate refractive index and 510 nm in spectrometric wavelength $\lambda$, as detailed in the table below:

TABLE 4

| Layer # | Refractive Index | Spectrometric wavelength | Materials |
|---|---|---|---|
| Substrate | 2.00 | | |
| 1st Layer | 1.63 | 0.50 $\lambda$ | Mixtures of $Al_2O_3$ |
| 2nd Layer | 2.23 | 0.50 $\lambda$ | $Ta_2O_5$ |
| 3rd Layer | 1.39 | 0.25 $\lambda$ | $MgF_2$ |
| Air | 1.00 | | |

Figure 5:
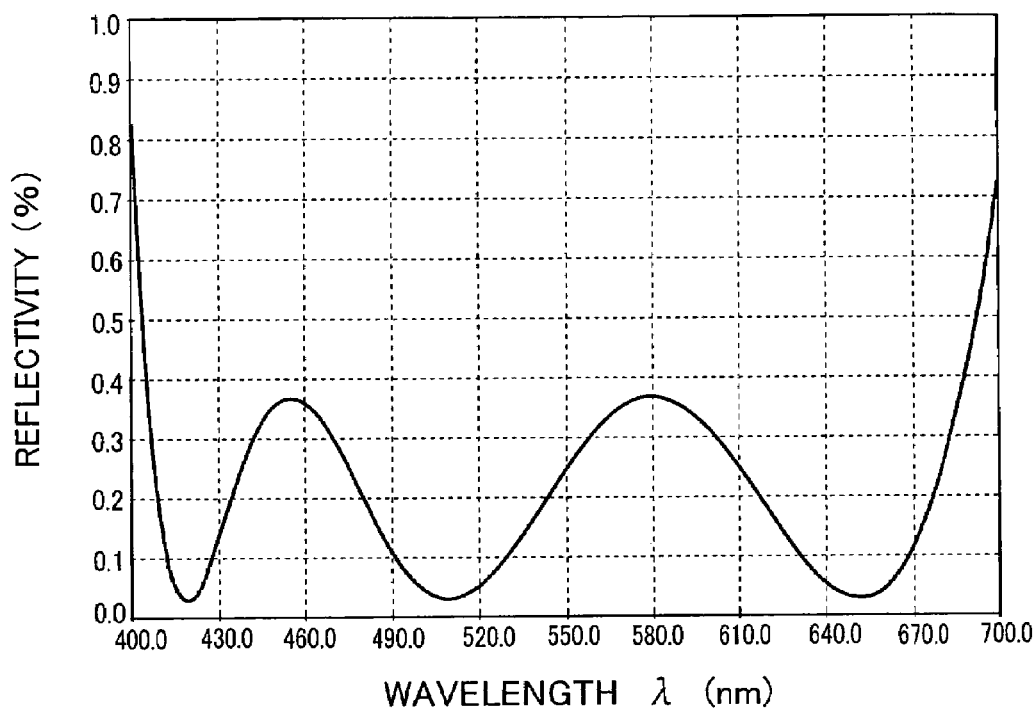
FIG. 5 is a graph showing a reflectivity for a fourth preferred embodiment of the anti-reflection film.

FIG. 5 shows a reflectivity of the fourth embodiment of the anti-reflection film in the event of the incident angle of light beam ranging from 0 to 10 degrees. This embodiment of the anti-reflection film is 2.00 in substrate refractive index, 1.63 in first-layer refractive index, 2.23 in second-layer refractive index, and 1.39 in third-layer refractive index, and the materials of the first, second, and third layers are $Al_2O_3$, $Ta_2O_5$, and $MgF_2$, respectively. The characteristic curve in FIG. 5 related to the fourth embodiment of the anti-reflection film is a median curve of that in FIGS. 3 and 4 related to the second and third embodiments of the anti-reflection film. The reflectivity of the fourth embodiment of the anti-reflection film reaches as low as approximately 0.4% or below even at the peaks in the visible light transmitting band, and can be reduced down to approximately 0.2% in average. Since other significant points are similar to those of the previous embodiments, and details about them are omitted.

Embodiment 5

Further another or a fifth embodiment of the anti-reflection film according to the present invention is 2.00 in substrate refractive index and 510 nm in spectrometric wavelength $\lambda$, as detailed in the table below:

TABLE 5

| Layer # | Refractive Index | Spectrometric wavelength | Materials |
|---|---|---|---|
| Substrate | 2.00 | | |
| 1st Layer | 1.78 | 0.50 $\lambda$ | $Y_2O_3$, or Mixtures of $La_2O_3$ and $Al_2O_3$ |
| 2nd Layer | 2.10 | 0.50 $\lambda$ | Mixtures of $ZrO_2$ and $TiO_2$, or $CeO_2$ |
| 3rd Layer | 1.38 | 0.25 $\lambda$ | $MgF_2$ |
| Air | 1.00 | | |

Figure 6:
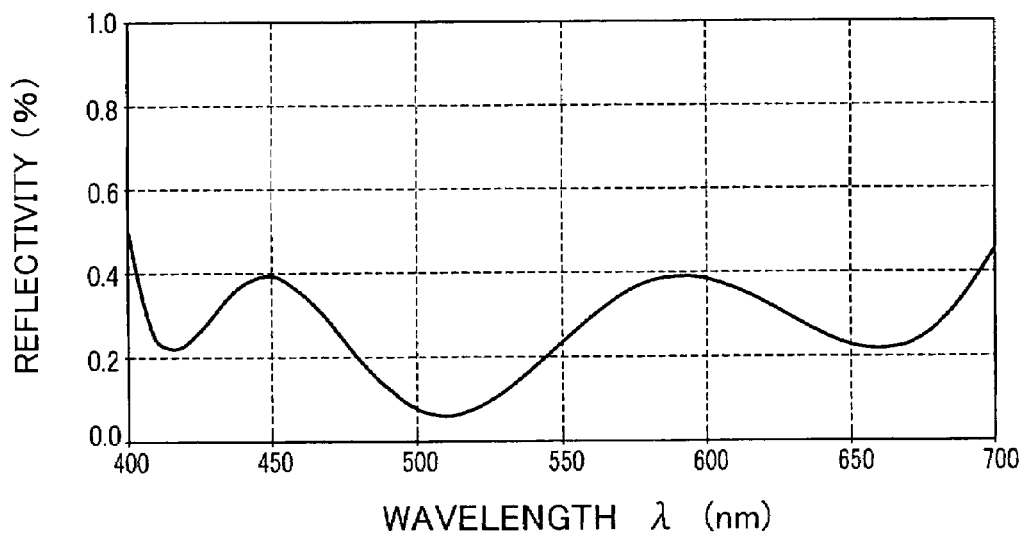
FIG. 6 is a graph showing a reflectivity for a fifth preferred embodiment of the anti-reflection film.

FIG. 6 shows the reflectivity of the fifth embodiment of the anti-reflection film in the event of the incident angle of light beam ranging from 0 to 10 degrees. This embodiment of the anti-reflection film is 2.00 in substrate refractive index and 2.10 in second-layer refractive index, and the material of the second layer is mixtures of $ZrO_2$ and $TiO_3$, or $CeO_2$. The fifth embodiment of the anti-reflection film exhibits a reflectivity as low as 0.3% in average throughout the entire visible light transmitting band ranging from 400 nm to 700 nm.

Embodiment 6

Yet another or a sixth embodiment of the anti-reflection film according to the present invention is 2.10 in substrate refractive index and 510 nm in spectrometric wavelength $\lambda$, as detailed in the table below:

TABLE 6

| Layer # | Refractive Index | Spectrometric wavelength | Materials |
|---|---|---|---|
| Substrate | 2.10 | | |
| 1st Layer | 1.80 | 0.50 $\lambda$ | $Y_2O_3$, or Mixtures of $La_2O_3$ and $Al_2O_3$ |
| 2nd Layer | 2.23 | 0.50 $\lambda$ | $Ta_2O_5$ |
| 3rd Layer | 1.38 | 0.25 $\lambda$ | $MgF_2$ |
| Air | 1.00 | | |

Figure 7:
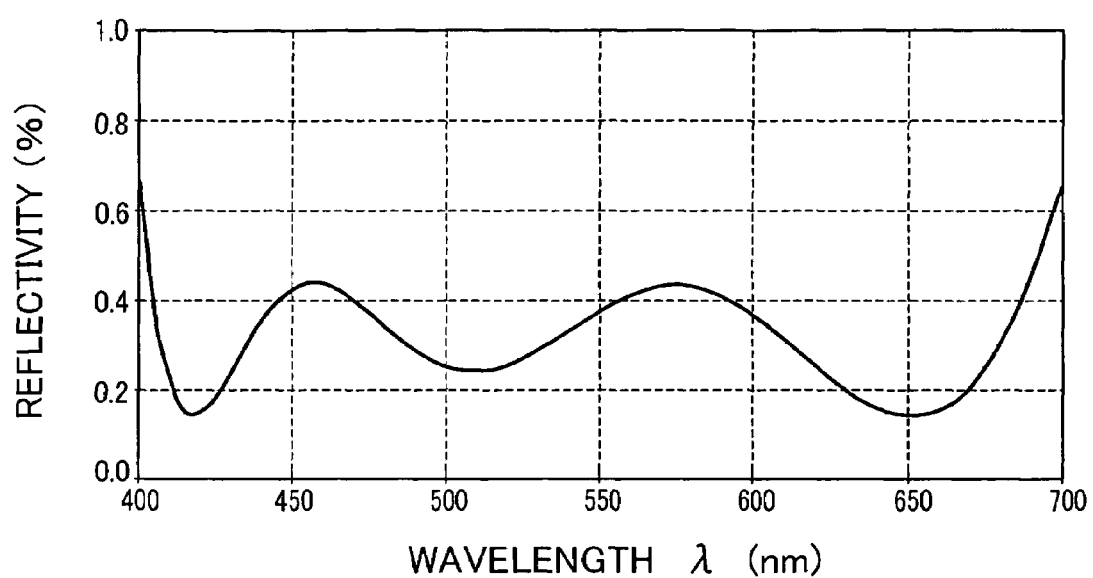
FIG. 7 is a graph showing a reflectivity for a sixth preferred embodiment of the anti-reflection film.

FIG. 7 shows the reflectivity of the sixth embodiment of the anti-reflection film in the event of the incident angle of light beam ranging from 0 to 10 degrees. This embodiment of the anti-reflection film is 2.10 in substrate refractive index and 2.23 in second-layer refractive index, and the material of the second layer is restricted to $Ta_2O_5$. The sixth embodiment of the anti-reflection film exhibits a reflectivity as low as 0.5% in average throughout the entire visible light transmitting band ranging from 400 nm to 700 nm.

The present invention is not limited to the aforementioned embodiments, but any material can be applied to the substrate so far as it has a refractive index falling in the range defined in the appended claim 1. For each of the component layers, any material besides those described in the context of the preferred embodiments is applicable if it attains the similar effects. The optimum values of the refractive index and film thickness of each of the component layers may be varied to be suitable for the material selected on the case-by-case basis.

What is claimed is:

1. An anti-reflection film that has three component layers overlying a substrate and deposited one over another in the order as denoted by ordinal numbers, 1st to 3rd where, at an arbitrary design basis wavelength $\lambda$ within a wavelength range in and near visible band, a refractive index 'n' and an optical film thickness (spectrometric wavelength) 'nd' are given as follows for each of the substrate and the component layers deposited on the same:

|  | Refractive Index 'n' | Optical Film thickness 'nd' |
|---|---|---|
| Substrate | $1.90 \leq n_s \leq 2.10$ |  |
| 1st Layer | $1.54 \leq n_1 \leq 2.00$ | $0.465\lambda \leq n_1 d_1 \leq 0.575\lambda$ |
| 2nd Layer | $1.95 \leq n_2 \leq 2.63$ | $0.490\lambda \leq n_2 d_2 \leq 0.508\lambda$ |
| 3rd Layer | $1.35 \leq n_3 \leq 1.55$ | $0.245\lambda \leq n_3 d_3 \leq 0.255\lambda$ |

2. An anti-reflection film according to claim 1, wherein $n_3 < n_1 < n_2$ or $n_1 < n_s < n_2$ is satisfied.

3. An anti-reflection film according to claim 1, wherein the first to third layers are produced by any means of sputtering, ion assisted deposition, and ion plating.

4. An anti-reflection film according to claim 1, wherein the first layer is made of either $Y_2O_3$ or $Al_2O_3$.

5. An anti-reflection film according to claim 1, wherein the second layer is made of any of mixtures of $ZrO_2$ and $TiO_2$, $TiO_2$, $Ta2O_5$, $Nb2O_5$, and the like.

6. An anti-reflection film according to claim 1, wherein the third layer is made of either $SiO_2$ or $MgF_2$.

7. An anti-reflection film according to claim 1, wherein the first layer has an optical film thickness (spectrometric wavelength) $n_1 d_1$ twice as large as that of the third layer, $n_3 d_3$, while the second layer has an optical film thickness $n_2 d_2$ twice as large as $n_3 d_3$.

8. An anti-reflection film that is deposited on a substrate of 1.90 or higher in refractive index and of optical material, and that has first to third layers;

the first layer being made of a material selected from $Y_2O_3$ and $Al_2O_3$, overlying the substrate with an optical film thickness (spectrometric wavelength) greater than that of the third layer, the second layer being made of material selected from $ZrO_2$, $TiO_2$, mixtures of them, $Ta2O_5$, and $Nb2O_5$, overlying the substrate with the optical film thickness greater than that of the third layer, and the third layer being made of a material selected from $SiO_2$, $MgF_2$, and $CaF_2$.

9. An anti-reflection film according to claim 7, wherein the first to third layers are produced by any means of sputtering, ion assisted deposition, and ion plating.

10. An anti-reflection film according to claim 8, wherein the third layer has its refractive index $n_3$ smaller than any of the refractive indices $n_s$, $n_1$ and $n_2$ of the substrate, the first layer, and the second layer.

11. An anti-reflection film according to claim 8, wherein the first layer has its refractive index $n_1$ smaller than any of the refractive indices $n_s$, $n_2$ and $n_3$ of the substrate, the second layer, and the third layer.

* * * * *